United States Patent [19]

Goto

[11] Patent Number: 4,865,299
[45] Date of Patent: Sep. 12, 1989

[54] FLUID-FILLED CYLINDRICAL ELASTIC MOUNT HAVING MOVABLE MEMBER IN FLUID CHAMBER

[75] Inventor: Katsuhiro Goto, Komaki, Japan

[73] Assignees: Tokai Rubber Industries, Ltd.; Toyota Jidosha Kabushiki Kaisha, both of Aichi, Japan

[21] Appl. No.: 318,119

[22] Filed: Mar. 2, 1989

[30] Foreign Application Priority Data

Mar. 8, 1988 [JP] Japan .................................. 63-54123
Jun. 16, 1988 [JP] Japan ................................ 63-148656

[51] Int. Cl.[4] .......................... F16F 5/00; F16F 9/10; F16F 13/00; F16F 15/00; B60K 5/12
[52] U.S. Cl. .................................. 267/140.1; 180/300; 248/562; 248/636; 267/141.2; 267/219
[58] Field of Search .............. 267/140.1, 219, 220, 267/35, 140.2, 141.2, 141.3, 141.4, 141.5, 141.6, 141.7, 152, 153; 248/636, 562, 550, 638; 180/312, 902, 300; 123/192 R, 195 R

[56] References Cited

U.S. PATENT DOCUMENTS

| 4,728,086 | 3/1988 | Ishiyama et al. ........... | 267/140.1 |
| 4,738,434 | 4/1988 | Marjoram et al. ........... | 267/140.1 |
| 4,738,435 | 4/1988 | Flower et al. .............. | 267/140.1 |
| 4,749,173 | 6/1988 | Kanda ........................ | 248/562 X |
| 4,749,174 | 6/1988 | Kanda ........................ | 248/562 X |
| 4,768,760 | 9/1988 | LeFol ......................... | 248/562 X |
| 4,790,520 | 12/1988 | Tanaka et al. ............... | 248/636 X |

FOREIGN PATENT DOCUMENTS

| 3125040 | 3/1983 | Fed. Rep. of Germany ...... | 248/562 |
| 3502539 | 8/1985 | Fed. Rep. of Germany ...... | 248/562 |
| 4836151 | 11/1973 | Japan . | |
| 55-107142 | 8/1980 | Japan . | |
| 57-9340 | 1/1982 | Japan . | |
| 0049147 | 3/1985 | Japan ........................... | 267/140.1 |
| 0294235 | 12/1986 | Japan ........................... | 267/140.1 |
| 0118131 | 5/1987 | Japan ........................... | 267/140.1 |
| 0292941 | 12/1987 | Japan ........................... | 267/140.1 |
| 2200190 | 7/1988 | United Kingdom ............. | 180/300 |

Primary Examiner—Douglas C. Butler
Attorney, Agent, or Firm—Oliff & Berridge

[57] ABSTRACT

A fluid-filled cylindrical elastic mount having an inner and an outer sleeve which are disposed in mutually spaced-apart relation with each other, and an elastic body interposed between the inner and outer sleeves so as to elastically connect the inner and outer sleeves. The elastic body at least partially defines a fluid-filled chamber located between the inner and outer sleeves in a load-receiving direction in which a vibrational load is applied to the elastic mount. The elastic body includes a thin-walled portion which partially defines the fluid-filled chamber and which elastically yields to permit the chamber to be elastically deformed upon application of the vibrational load. A movable member is accommodated in the fluid-filled chamber such that the movable member is freely movable over a predetermined distance in the load-receiving direction. The movable member and inner surfaces of the fluid chamber cooperate with each other to define resonance portions having a predetermined radial depth as measured in the load-receiving direction.

14 Claims, 4 Drawing Sheets

FLUID-FILLED CYLINDRICAL ELASTIC MOUNT HAVING MOVABLE MEMBER IN FLUID CHAMBER

BACKGROUND OF THE INVENTION

1. Field of the Invention

The present invention relates generally to a fluid-filled cylindrical elastic mount adapted to damp and/or isolate an input vibrational load, based on flows of a fluid in a fluid chamber, and more particularly to such a fluid-filled elastic mount which is simple in construction and which exhibits excellent vibration isolating characteristics with respect to high-frequency vibrations.

2. Discussion of the Prior Art

A cylindrical elastic mount such as a suspension bushing or engine mount used on an automotive vehicle is known for elastically connecting two members in a vibration system in a vibration damping or isolating manner, or for elastically mounting one of the two members on the other member such that the above one member is supported by the other member in a vibration damping or isolating manner. Such a cylindrical elastic mount has an inner and an outer sleeve which are disposed in coaxial or non-coaxial, mutually radially spaced-apart relationship with each other, and an elastic body which elastically connects the inner and outer sleeves. A suitable shaft member fixed to the above one member is fixedly inserted through the inner sleeve, while the other member as a support member is fitted on the outer sleeve. Thus, the elastic mount is interposed between the support member and the shaft member, so that input vibrations applied between these two members are damped and/or isolated based on elastic deformation of the elastic body of the elastic mount.

Since a rubber material is used as the elastic body in such a cylindrical elastic mount as described above, the elastic mount suffers from a potential drawback that the rubber elastic body exhibits an excessively high degree of stiffness due to its resonance upon application of vibrations having relatively high frequencies.

The resonance of the elastic body usually occurs when the frequency of the input vibrations falls within a range of about 300–700 Hz, where the cylindrical elastic mount is used as an engine mount for mounting an engine unit on a front-engine front-drive vehicle (FF vehicle), for example. Thus, the booming noises such as engine-transmitted noises, and other high-frequency vibrations cannot be sufficiently isolated by the elastic mount. In view of the recent increasing requirement for improved noise isolation and driving comfort of the motor vehicles, in particular, there has been a growing need for improving the vibration isolating characteristics of the elastic mount with respect to the high-frequency vibrations applied thereto.

SUMMARY OF THE INVENTION

The present invention was developed in view of the drawback encountered in the prior art. It is therefore an object of the present invention to provide a fluid-filled cylindrical elastic mount which is simple in construction and which exhibits improved vibration damping and isolating characteristics over a wide range of frequency of the input vibrations, while effectively avoiding stiffening of the elastic body upon application of the vibrations of relatively high frequencies.

The above object may be achieved according to the principle of the present invention, which provides a fluid-filled cylindrical elastic mount having an inner and an outer sleeve which are disposed in mutually spaced-apart relation with each other, and an elastic body interposed between the inner and outer sleeves so as to elastically connect the inner and outer sleeves, wherein the improvement comprises: a fluid chamber at least partially defined by the elastic body and located between the inner and outer sleeves in a load-receiving direction in which a vibrational load is applied to the elastic mount, the fluid chamber being filled with a non-compressible fluid having a predetermined value of viscosity; a thin-walled portion of the elastic body which partially defines the fluid chamber and which elastically yields to permit the fluid chamber to be elastically deformed upon application of the vibrational load in the load-receiving direction; a movable member accommodated in the fluid chamber such that the movable member is freely movable over a predetermined distance within the fluid chamber in the load-receiving direction; and resonance portions which are defined within the fluid chamber, between the movable member and the inner surface of the fluid chamber, and which have a predetermined radial depth as measured in the load-receiving direction.

The fluid-filled cylindrical elastic mount of the present invention constructed as described above exhibits a sufficiently low spring rate, based on the flows of the fluid through the resonance portions of the fluid chamber, while effectively preventing the stiffening of the elastic body, even when the elastic mount is subjected to high-frequency vibrations. Therefore, the instant elastic mount is capable of providing an excellent damping or isolating effect with respect to input vibrations over a wide frequency range, from medium- to high-frequency vibrations.

The thin-walled portion of the elastic body may consist of axial end portions of the elastic body which define axial opposite ends of the fluid chamber. The elastic body may have an axial void which extends in an axial direction of the elastic mount. The fluid chamber and the axial void may be disposed at respective circumferential portions of the elastic mount which are diametrically opposite to each other in the load-receiving direction.

The kinematic viscosity value of the non-compressible fluid which fills the fluid chamber is preferably not higher than 500 centistokes, more preferably not higher than 100 centistokes.

The movable member may have a generally arcuate shape in cross section taken in a plane perpendicular to an axial direction of the elastic mount. In this case, the movable member has an outer and an inner arcuate surface which partially define the resonance portions.

The inner surface of the movable member which defines one of the resonance portions may be held in contact with an inner surface of the elastic body partially defining the fluid chamber, when the elastic mount is installed for service with a static load applied thereto. Alternatively, the inner surface of the movable member may be held spaced apart from the inner surface of the elastic body which partially defines the fluid chamber when the elastic mount is installed for service.

The predetermined distance of movement of the movable member within the fluid chamber may preferably be within a range of 2–16 mm, and the ratio of this movement distance to a radial dimension of the fluid chamber is preferably within a range of 0.05–0.50.

According to an advantageous form of the present invention, the fluid chamber consists of a pressure-receiving chamber which receives the vibrational load applied between the inner and outer sleeves, such that a pressure of the non-compressible fluid within the pressure-receiving chamber is variable, and the elastic body further includes a flexible portion which at least partially defines an equilibrium chamber which is filled with the non-compressible fluid. The equilibrium chamber is located between the inner and outer sleeves and spaced from the pressure-receiving chamber so as to avoid application of the vibrational load to the equilibrium chamber. The elastic mount further includes means for defining a restricted fluid passage for restricted fluid communication between the pressure-receiving and equilibrium chambers.

The above form of the elastic mount of the invention having the equilibrium chamber in restricted fluid communication with the pressure-receiving chamber through the restricted fluid passage is capable of providing an improved effect of damping low-frequency vibrations, based on the flows of the fluid through the restricted fluid passage between the pressure-receiving chamber and the equilibrium chamber, as well as exhibits a low spring constant for effectively isolating the medium- and high-frequency vibrations, as indicted above.

In the above form of the invention, an axial void may be provided so as to extend in the axial direction of the elastic body. In this case, the flexible portion of the elastic body may be used to divide the axial void and the equilibrium chamber. The elastic mount may further comprise a thin-walled sleeve which is fitted on the elastic body and which cooperates with the outer sleeve to define the restricted fluid passage.

BRIEF DESCRIPTION OF THE DRAWINGS

The foregoing and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
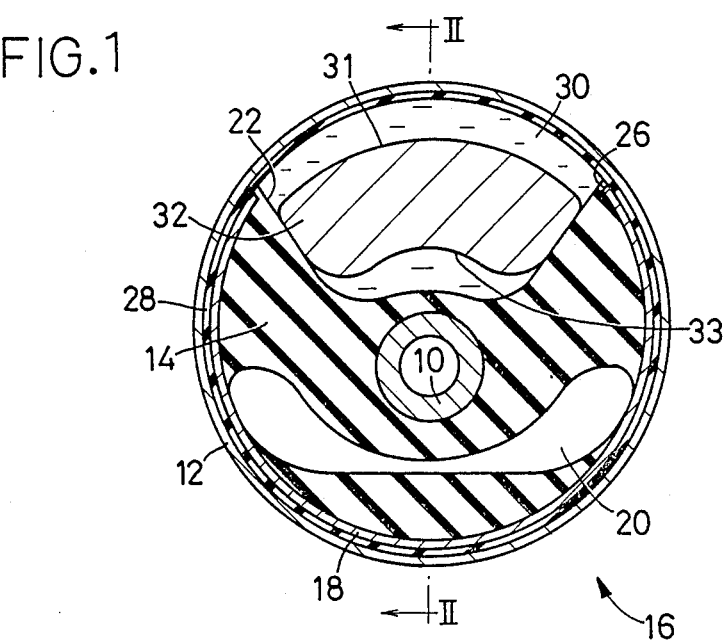
FIG. 1 is an elevational view in transverse cross section of one embodiment of a fluid-filled cylindrical elastic mount of the present invention in the form of an engine mount for a motor vehicle.
Figure 2:
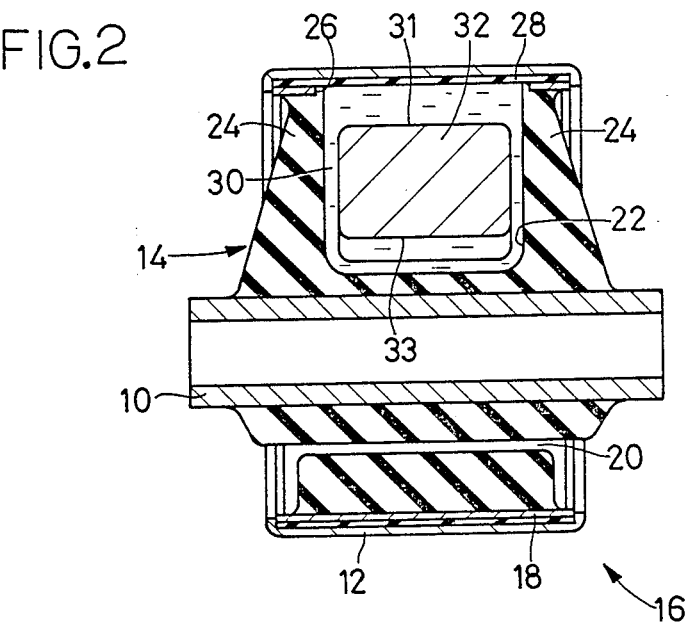
FIG. 2 is an elevational view in axial cross section of the engine mount of FIG. 1, taken along line II—II of FIG. 1.

Referring first to FIGS. 1 and 2, reference numeral 10 denotes a metallic inner sleeve of an engine mount suitably adapted for mounting an engine on a motor vehicle of a front-engine front drive (F—F) type. Radially outwardly of this inner sleeve 10, there is disposed a metallic outer sleeve 12, such that the inner and outer sleeves 10, 12 are radially spaced apart from each other by a predetermined suitable distance, when the engine mount is installed for service on the motor vehicle (as indicated in FIG. 3).

Between the metallic inner and outer sleeves 10, 12, there is interposed an elastic body 14 having a generally annular configuration, whereby the inner and outer sleeves 10, 12 are elastically connected to each other.

Figure 3:
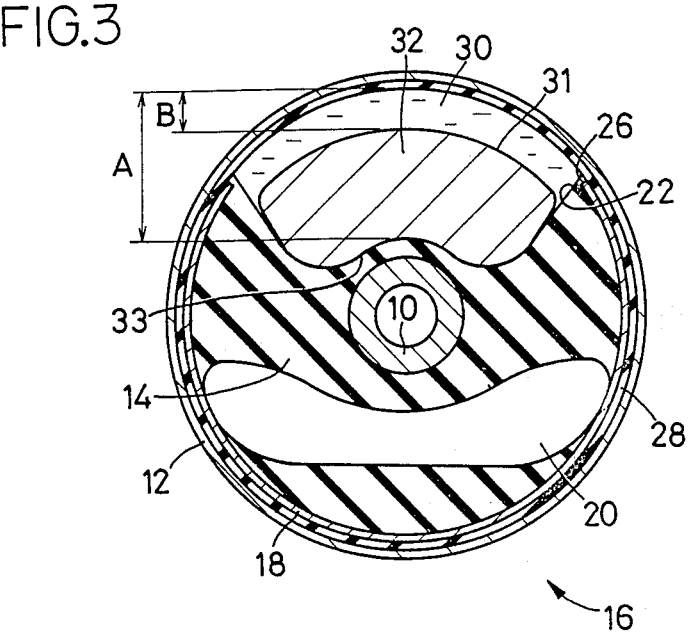
FIG. 3 is an elevational view in transverse cross section of the engine mount, when installed on a motor vehicle.
Figure 4:
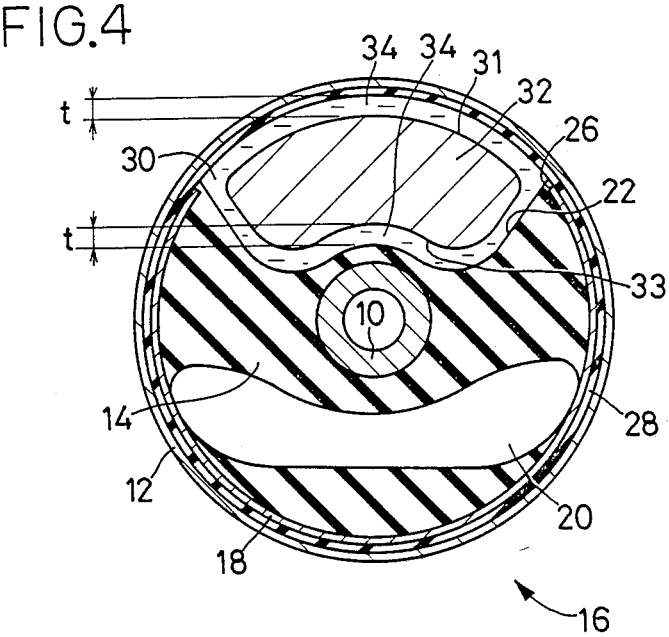
FIG. 4 is an elevational transverse cross sectional view illustrating the engine mount during application of a vibrational load thereto.

The present engine mount, generally indicated at 16 in FIGS. 1-4, is installed on the motor vehicle for mounting an engine unit on the body of the vehicle in a vibration damping or isolating manner. The vehicle body is provided with mounting rods, while the engine unit has fixing brackets each having a mounting hole. Each mounting rod of the vehicle body is fixedly inserted through the inner sleeve 10, while the outer sleeve 12 is press-fitted in the mounting hole of the corresponding fixing bracket of the engine unit. With the engine mount 16 installed in position in this manner, the inner and outer sleeves 10, 12 are brought into coaxial relationship with each other, by weight of the engine unit, as indicated in FIGS. 3 and 4. In this condition, the engine mount 16 receives a vibrational load applied thereto primarily in the radial direction in which the inner and outer sleeves 10, 12 are offset as indicated in FIGS. 1 and 2 before installation of the engine mount 16 on the vehicle. This radial direction will be referred to as "load-receiving direction" of the engine mount, when appropriate.

While the elastic body 14 is secured directly to the outer surface of the inner sleeve 10, it is indirectly secured to the inner surface of the outer sleeve 12, via a thin-walled sleeve 18 and a sealing rubber layer 28, such that the elastic body 14 is secured to the inner surface of the sleeve 18 while the rubber layer 28 is interposed between the sleeves 12, 18. The inner sleeve 10, elastic body 14 and thin-walled sleeve 18 are formed as an integral unit, as a result of vulcanization of an unvulcanized rubber material within a suitable mold in which the sleeves 10 and 18 are set in place relative to each other.

The elastic body 14 has an axial void 20 formed axially through a portion thereof which is located on one of diametrically opposite sides of the inner sleeve 10 in the load-receiving direction, on which the distance between the inner and outer sleeves 10, 12 is shorter than that on the other side, as viewed in FIGS. 1 and 2. That is, the axial void 20 is formed in a lower portion of the elastic body 14, such that the void 20 extends between substantially diametrically opposite positions on the outer circumference of the elastic body 14. This axial void 20 serves to minimize the amount of a tensile stress applied to the elastic body 14, due to the weight of the engine unit and an input vibrational load.

In a portion of the elastic body 14 on the other side of the inner sleeve 10 on which the distance between the inner and outer sleeves 10, 12 is larger in the load-receiving direction, there is formed a pocket 22 such that the axial void 20 and the pocket 22 are diametrically opposite to each other in the load-receiving direction, with respect to the inner sleeve 10. The pocket 22 is open in the outer circumferential surface of the elastic body 14, and is aligned with an aperture or window 26 formed through the corresponding circumferential portion of the thin-walled sleeve 18, so that the pocket 26 is exposed to the inner surface of the sealing rubber layer 28.

With the pocket 26 formed, the elastic body 14 has relatively thin-walled opposite axial end portions 24, 24, which permit the elastic body 14 to be easily displaceable in the axial direction. While the axial void 20 is provided to minimize the tensile stress or strain of the elastic body 14, the pocket 26 formed in the portion subject to a compressive stress serves to facilitate the radially inward deformation or compression of the elastic body 14, during application of a radial vibrational load between the inner and outer sleeves 10, 12.

The outer sleeve 12 having the sealing rubber layer 28 secured to its inner surface is pressed fitted on the integral unit or intermediate product 10, 14, 18 prepared by vulcanization of the elastic body 14. Then, the outer sleeve 12 is radially inwardly pre-compressed at its axial end portions, by a roll-calking technique. As a result, the pocket 22 is fluid-tightly closed by the sealing rubber layer 28, whereby a fluid chamber 30 having a suitable volume is defined.

The fluid chamber 30 is filled with a non-compressible fluid having a relatively low viscosity. This filling is effected while the outer sleeve 12 is fitted on the integral intermediate product 10, 14, 18, within a mass of the selected non-compressible fluid contained in a suitable vessel. For a sufficient degree of fluidity of the fluid, the kinematic viscosity of the fluid is preferably not higher than 500 centistokes, and more preferably not higher than 100 centistokes. For instance, the non-compressible fluid is suitably selected from the group which includes water, ethylene glycol, propylene glycol, other alkylene glycols, low-viscosity polyalkylene glycol, low-viscosity silicone oil, and mixtures thereof.

When a radial vibrational load to be damped by the instant engine mount 16 is applied between the inner and outer sleeves 10, 12, the axial end portions 24, 24 are axially outwardly elastically displaced, while the portion defining the axial void 20 is elastically expanded so as to reduce the volume of the void 20, and the fluid chamber 30 is deformed such that the radial distance in the load-receiving direction is reduced.

Within the pressure-receiving chamber 30, there is accommodated a movable block 32 having a generally arcuate cross sectional shape as indicated at 31, 33 in FIG. 1. The movable block 32 is freely movable within the chamber 30, and the inner arcuate surface 33 has a profile substantially following the shape of the inner surface of the chamber 30 which is assumed when the engine mount 16 is installed in place with the weight of the engine unit acting on the outer sleeve 12, as indicated in FIG. 3. In the present embodiment, the movable block 32 is formed of an aluminum alloy, and is held in contact with the lower surface of the chamber 30, as indicated in FIG. 3, while the engine mount 16 is in a static-load condition wherein no dynamic load acts on the engine mount 16.

Upon application of a dynamic vibrational load to the engine mount 16 in the load-receiving direction, the inner and outer sleeves 10, 12 are displaced relative to each other in the load-receiving direction, whereby the radial distance or dimension (indicated at "A" in FIG. 3) of the fluid chamber 30 in the load receiving direction is cyclically increased and decreased, and the chamber 30 is elastically deformed. The shape of the non-compressible fluid mass is accordingly changed, with the axial end portions 24 and the axial void 20 being elastically displaced or deformed. As a result, there arise flows of the fluid in the fluid chamber 30.

The flows of the fluid cause the movable block 32 to be kept away from the lower surface of the chamber 30 and be held in a suspended state within the fluid mass, as indicated in FIG. 4. Around the movable block 32 in the suspended state during application of the vibrational load between the inner and outer sleeves 10, 12, there are formed fluid flow passages which include arcuate resonance portions 34 that are defined between the outer and inner arcuate surfaces 31, 33 of the movable block 32, and the radially opposite outer and inner surfaces of the chamber 30 (more precisely, the corresponding surfaces of the elastic body 14 and sealing layer 28). These arcuate resonance portions 34 have a radial depth "t" and extend along the outer and inner arcuate surfaces 31, 33 of the movable block 32. With the vibrational load applied between the inner and outer sleeves 10, 12, the fluid oscillatingly flows in the circumferential and axial directions of the engine mount 16, particularly through the resonance portions 34, with the radial depth "t" varying in a cyclic manner. As a result, the dynamic spring constant of the engine mount 16 is effectively lowered, based on the flows or resonance of the fluid within the fluid chamber 30, whereby the vibrational load is accordingly isolated.

The range of frequency of the vibrations to which instant engine mount 16 exhibits a reduced dynamic spring constant is selected or determined as desired, by adjusting the radial depth "t" and other dimensions of the arcuate resonance portions 34, and thereby tuning the resonance frequency of the fluid flowing through the resonance portions 34, depending upon the modulus of elasticity (dynamic spring constant) of the elastic body 14, weight or specific gravity of the movable block 32 and the viscosity of the non-compressible fluid. The instant engine mount 16 may be tuned so that the resonance frequency of the fluid in the fluid chamber 30 is relatively high.

More specifically, the dimensions of the arcuate resonance portions 34 including the depth "t" are normally determined such that (a) a distance "B" (indicated in FIG. 3) over which movable block 32 is movable in the load-receiving direction is within a range of 2–16 mm, preferably 3–10 mm, that (b) a ratio of the distance "B" to the radial dimension "A" in the non-load state is within a range of 0.05–0.50, preferably 0.10–0.40, and that (c) a total area of the outer and inner arcuate surfaces 31, 33 of the movable block 32 is at least 100 mm$^2$, preferably at least 2000 mm$^2$.

The instant engine mount 16 constructed as described above exhibits a low dynamic spring constant for effectively isolating the input vibrations in a relatively high frequency range, based on the flows or resonance of the fluid in the arcuate resonance portions 34 on the opposite outer and inner sides of the movable block 32, with the depth "t" of each resonance portion 34 varying at the resonance frequency of the fluid. Thus, the engine mount 16 is effectively prevented from exhibiting excessively high stiffness due to resonance of the elastic body 14, even when the frequency of the input vibrations is comparatively high.

In other words, the instant engine mount 16 may be suitably adapted to exhibit comparatively soft spring characteristics with respect to the input vibrations of medium and high frequency ranges, whereby these medium- and high-frequency vibrations may be effectively damped and/or isolated, permitting considerably reduced noises heard within the vehicle compartment, and significantly improved driving comfort of the vehicle.

Figure 5:
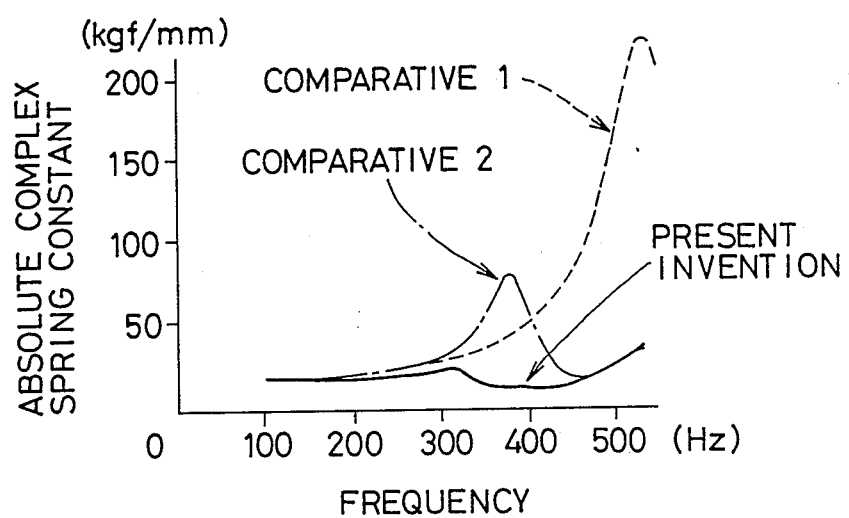
FIG. 5 is a graph showing experimental data indicating vibration damping/isolating characteristics or spring constant-frequency relationships of the engine mount of FIGS. 1-4, as compared with those of comparative examples.

The graph in FIG. 5 shows experimental data indicating the relationship between the absolute value of complex spring constant of the instant engine mount 16 and the frequency of the input vibrations, as compared with those of comparative examples 1 and 2. The comparative example 1 uses an elastic block which does not have a fluid-filled chamber and a movable block. The comparative example 2 uses an elastic block which has a fluid-filled chamber but does not have a movable block in the fluid-filled chamber.

In the experiment, the fluid chamber was filled with water, in the instant embodiment and comparative example 1, and the movable block 32 of the instant embodiment was formed of an aluminum alloy. Further, the experiment was conducted with an initial static load of 105 kgf applied between the inner and outer sleeves (10, 12), and with a dynamic vibrational load of ±10G applied therebetween.

It will be apparent from the graph of FIG. 5 that the dynamic spring constant of the instant embodiment was kept at a sufficiently low level for the medium- and high-frequency vibrations, while the dynamic spring constants of the comparative examples 1 and 2 were comparatively high for such medium- and high-frequency vibrations. This means excellent damping-/isolating capability of the instant engine mount 16, for the input vibrations over a relatively wide range of frequency.

The improved damping/isolating capability of the instant engine mount 16 for the relatively high-frequency vibrations may be accomplished by simply inserting the movable block 32 in the fluid chamber 30 during assembly of the mount, namely, without using a complicated arrangement.

Figure 6:
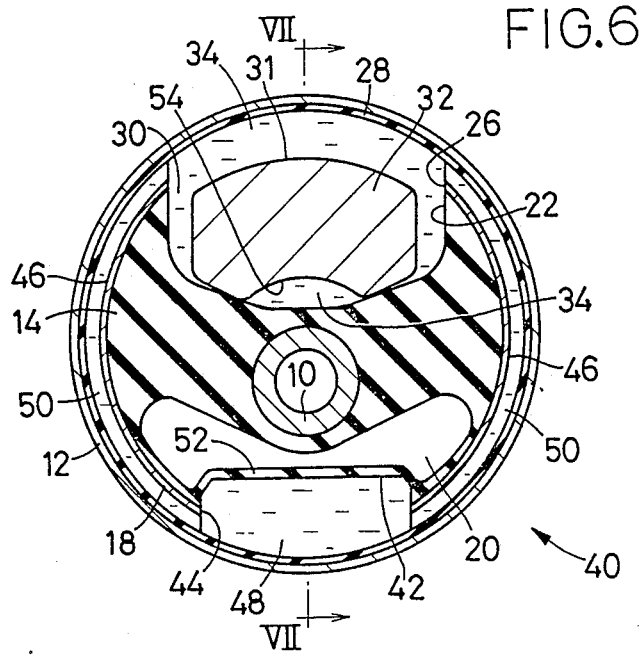
FIG. 6 is an elevational transverse cross sectional view depicting another form of the engine mount according to another embodiment of the invention.
Figure 7:
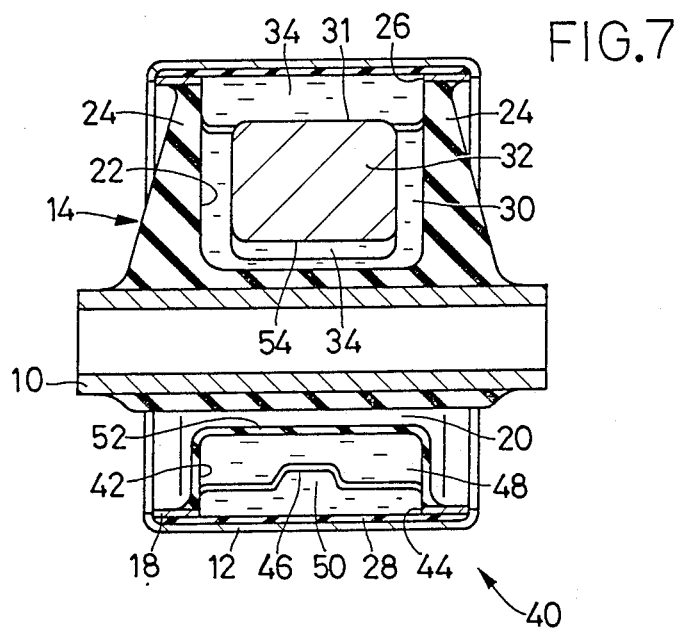
FIG. 7 is an elevational axis cross sectional view taken along line VII—VII of FIG. 6.

Referring next to FIGS. 6 and 7, there is illustrated a modified embodiment of the invention indicated generally at 40. FIGS. 6 and 7 corresponding to FIGS. 1 and 2 show the engine mount 40 in its non-load condition in which no static load is applied, i.e., show the engine mount 40 prior to the installation on a motor vehicle. In the interest of brevity and simplification, the same reference numerals as used in FIGS. 1 and 2 will be used in the instant modified embodiment, to identify the functionally corresponding elements, and no redundant description thereof will be provided.

In the engine mount 40, the elastic body 14 further has a recess 42 formed radially outwardly of the axial void 20, such that the recess 42 has a predetermined volume and the opening is aligned with an aperture or window 44 formed through the corresponding portion of the thin-walled sleeve 18. The thin-walled sleeve 18 has a pair of part-circumferential grooves 46, 46 formed in an axially intermediate portion, such that the grooves 46 are open in the radially outward direction of the elastic body 14 and connect the window 44 to the window 26 aligned with the pocket 22 (chamber 30).

With the outer sleeve 12 press-fitted on the thin-walled sleeve 18, the opening of the recess 42 is fluid-tightly closed by the sealing rubber layer 28, whereby an equilibrium chamber 48 is formed. This equilibrium chamber 48 is also filled with the non-compressible fluid described above with respect to the chamber 30. Further, the part-circumferential grooves 46, 46 are fluid-tightly closed by the rubber layer 28, whereby corresponding restricted fluid passages 50, 50 are formed so as to maintain restricted fluid communication between the fluid chamber 30 and the equilibrium chamber 48.

In the present modified engine mount 40, the axial end portions 24, 24 defining the opposite axial ends of the fluid chamber 30 are more rigid than those in the preceding embodiment, with the material and wall thicknesses of the portions 24 suitably determined, so that the axial end portions 24 do not elastically yield so much as to absorb the entire amount of change in the pressure in the fluid chamber 30, upon application of a vibrational load. In other words, the axial end portions 24 are sufficiently rigid to permit the fluid chamber 30 to function as a pressure-receiving chamber, wherein the pressure in the chamber 30 increases to some extent upon application of the vibrational load.

It will be understood that the axial void 20 and the equilibrium chamber 48 are separated from each other by a relatively thin flexible diaphragm 52 which is readily displaceable so as to allow the volume of the equilibrium chamber 48 to change upon application of a vibrational load in the load-receiving direction, whereby the pressure change in the equilibrium chamber 48 may be suitably avoided.

In the instant engine mount 40, a pressure change in the pressure-receiving chamber 30 due to the input vibrational load will cause the fluid to flow between the pressure-receiving and equilibrium chambers 30, 48, through the part-circumferential restricted fluid passages 50. Accordingly, the vibrations may be effectively damped or isolated based on the flows or resonance of the fluid masses. The frequency range of the vibrations to be effectively damped by the instant engine mount 40 may be adjusted by tuning the resonance frequency of the fluid flowing through the restricted passages 50, by adjusting the cross sectional area and length of the passages 50.

Usually, the restricted passages 50 are tuned so that the engine mount 40 exhibits excellent damping capability with respect to low-frequency vibrations having a frequency in the neighborhood of 10 Hz, such as engine shake and bounce of the engine unit.

While a conventional engine mount without a movable block as indicated at 32 will suffer from excessively high stiffness for high-frequency vibrations which tend to cause the restricted passages 50 to be closed, the use of the movable block 32 to provide the arcuate resonance portions 34 is effective to solve such a conventionally experienced problem. Namely, the high-frequency vibrations may also be suitably isolated based on the flows or resonance of the fluid in the resonance portions 34 of the pressure-receiving chamber 30.

As described above, the instant engine mount 40 exhibits a high damping effect with respect to the low-frequency vibrations, based on the flows or resonance of the fluid through the restricted fluid passages 50, and also a high isolating effect with respect to the medium- and high-frequency vibrations, based on the flows or resonance of the fluid in the resonance portions 34 provided around the movable block 32 disposed in the pressure-receiving chamber 30.

The movable block 32 used in the engine mount 40 has an inner arcuate surface 54 which has a smaller radius of arc than that of the inner arcuate surface 33 of the block 32 used in the first embodiment. Further, the portion of the inner surface of the elastic block 14 which opposes the inner arcuate surface 54 of the movable block 32 is formed to be substantially flat. This arrangement provides a certain amount of clearance or spacing between the inner arcuate surface 54 and the corresponding surface of the elastic block 14, with a static load (weight of the engine unit) being applied to the engine mount (even before a dynamic vibrational load is applied). This facilitates a radially outward movement of the movable block 32 away from the elastic block 14 when the vibrational load is applied to the engine mount 40.

While the fluid-filled elastic mount of the present invention has been described in its presently preferred embodiments, for illustrative purpose only, it is to be understood that the invention is not limited to the details of the illustrated embodiments, but various changes, modifications and improvements may be made in the invention.

For instance, the movable block 32 may be formed of a material other than aluminum alloys, such as a resin or stainless steel, depending upon the specific gravity and other properties of the non-compressible fluid. Further, the movable block 32 may take a suitable form other than an arcuate shape, such as a rectangular or cylindrical or columnar shape, depending upon the shape of the fluid chamber 30. The movable block 32 may be a hollow member, or may have a specific gravity lower than that of the non-compressible fluid so that the movable block 32 may float on the fluid mass, with a static load applied to the engine mount.

The axial void 20 is effective to increase the durability of the elastic body 14, and to permit the resonance of the fluid in the resonance portions 34 and permit the fluid to flow through the restricted fluid passages 50 (in the engine mount 40). However, this axial void 20 is not essential to the practicing of the principle of the present invention.

Although the illustrated embodiments are adapted to be used as engine mounts for a motor vehicle, the concept of the invention may be embodied as vehicle suspension bushings, and other fluid-filled elastic mounts whose applications are not limited to the motor vehicle.

It is also to be understood that the present invention may be embodied with various other changes, modifications and improvements, which may occur to those skilled in the art, without departing from the spirit and scope of the invention defined in the following claims.

What is claimed is:

1. A fluid-filled cylindrical elastic mount having an inner and an outer sleeve which are disposed in mutually spaced-apart relation with each other, and an elastic body interposed between the inner and outer sleeves so as to elastically connect the inner and outer sleeves, wherein the improvement comprises:

said elastic body at least partially defining a fluid chamber located between said inner and outer sleeves in a load-receiving direction in which a vibrational load is applied to the elastic mount, said fluid chamber being filled with a non-compressible fluid having a predetermined value of viscosity;

said elastic body including a thin-walled portion which partially defines said fluid chamber and which elastically yields to permit said fluid chamber to be elastically deformed upon application of the vibrational load in said load-receiving direction;

a movable member accommodated in said fluid chamber such that the movable member is freely movable over a predetermined distance within said fluid chamber in said load-receiving direction; and said movable member and inner surfaces of said fluid chamber cooperating with each other to define resonance portions having a predetermined radial depth as measured in said load-receiving direction.

2. A fluid-filled cylindrical elastic mount according to claim 1, wherein said thin-walled portion of said elastic body consists of axial end portions of said elastic body which define axial opposite ends of said fluid chamber.

3. A fluid-filled cylindrical elastic mount according to claim 1, wherein said elastic body has an axial void which extends in an axial direction of the elastic mount, said fluid chamber and said axial void being disposed at respective circumferential portions of the elastic mount which are diametrically opposite to each other in said load-receiving direction.

4. A fluid-filled cylindrical elastic mount according to claim 1, wherein said non-compressible fluid has a kinematic viscosity value not higher than 500 centistokes.

5. A fluid-filled cylindrical elastic mount according to claim 4, wherein said non-compressible fluid has a kinematic viscosity value not higher than 100 centistokes.

6. A fluid-filled cylindrical elastic mount according to claim 1, wherein said movable member has a generally arcuate shape in cross section taken in a plane perpendicular to an axial direction of the elastic mount, said movable member having an outer and an inner arcuate surface which partially define said resonance portions.

7. A fluid-filled cylindrical elastic mount according to claim 1, wherein said movable member has an inner surface which partially defines one of said resonance portions and which is held in contact with an inner surface of said elastic body partially defining said fluid chamber, when said elastic mount is installed for service with a static load applied thereto.

8. A fluid-filled cylindrical elastic mount according to claim 1, wherein said movable member has an inner surface which partially defines one of said resonance portions and which is held spaced away from an inner surface of said elastic body partially defining said fluid chamber, when said elastic mount is installed for service with a static load applied thereto.

9. A fluid-filled cylindrical elastic mount according to claim 1, wherein said predetermined distance of movement of said movable member is within a range of 2–16 mm.

10. A fluid-filled cylindrical elastic mount according to claim 1, wherein a ratio of said predetermined distance of movement of said movable member to a radial dimension of said fluid chamber is within a range of 0.05–0.50.

11. A fluid-filled cylindrical elastic mount according to claim 1, wherein said fluid chamber consists of a pressure-receiving chamber which receives said vibrational load applied between said inner and outer sleeves, such that a pressure of said non-compressible fluid within said pressure-receiving chamber is variable, said elastic body further including a flexible portion which at least partially defines an equilibrium chamber which is filled with said non-compressible fluid, said equilibrium chamber being located between said inner and outer sleeves and spaced from said pressure-receiving chamber so as to avoid application of said vibrational load to said equilibrium chamber, said elastic mount further including means for defining a restricted fluid passage for restricted fluid communication between said pressure-receiving and equilibrium chambers.

12. A fluid-filled cylindrical elastic mount according to claim 11, wherein said elastic body has an axial void which extends in an axial direction of the elastic mount, said pressure-receiving chamber and said axial void being disposed at respective circumferential portions of the elastic mount which are diametrically opposite to each other in said load-receiving direction, said flexible portion dividing said axial void and said equilibrium chamber.

13. A fluid-filled cylindrical elastic mount according to claim 11, wherein said movable member has an inner surface which partially defines one of said resonance portions and which is held spaced away from an inner surface of said elastic body partially defining said pressure-receiving chamber, when said elastic mount is installed for service with a static load applied thereto.

14. A fluid-filled cylindrical elastic mount according to claim 11, further comprising a thin-walled sleeve which is fitted on said elastic body and which cooperates with said outer sleeve to define said restricted fluid passage.

* * * * *